Oct. 14, 1958     K. G. ÅHLÉN     2,855,767

YIELDABLE COUPLING

Filed March 17, 1953

INVENTOR.
Karl Gustav Åhlén
BY
his Attorney

United States Patent Office 2,855,767
Patented Oct. 14, 1958

2,855,767
YIELDABLE COUPLING

Karl Gustav Åhlén, Stockholm, Sweden, assignor, by mesne assignments, to Svenska Rotor Maskiner Aktiebolag, Nacka, Sweden, a corporation of Sweden Application March 17, 1953, Serial No. 342,906

Claims priority, application Sweden March 20, 1952

6 Claims. (Cl. 64—13)

This invention relates to couplings for power transmission between a driving and a driven member and especially to such couplings between two independently axially fixed shaft members.

It is known in couplings of the kind under consideration to use a disc like diaphragm coupling member for effecting an axially elastic coupling between two coaxial shafts enabling a certain axial relative movement between the coaxial shaft ends and also compensating for a certain degree of misalignment, depending on expansion due to heat or inaccurate assembly, respectively. Such diaphragm couplings compensate, however, only for comparatively small relative axial movements and at greater displacements of the shaft ends the axial forces and the stress in the plate will increase to an order which in certain apparatus may disturb the operation or cause damage of the bearings and the plate, respectively.

The object of the present invention is, therefore, the provision of an axially elastic but torsionally stiff coupling for connecting the ends of two shaft members, which will permit the ends to move within a relatively great range of axial displacement without the axial forces being too high, the torsional stiffness of the coupling being maintained at safety values.

In order to obtain the above general object the invention provides in a preferred form for a coupling secured to the ends of two shaft members and comprising a central disc like portion fixed to one shaft end part, radially outwardly directed resilient beams or arms extending from said central disc like portion and being secured at their ends to the other shaft member and compressed by radially inwardly directed initial forces resulting in advantages specific for the present invention which will be disclosed more detailed in the ensuing portion of this specification, disclosing by way of example but without limitation, suitable embodiments of the invention.

Figure 8:
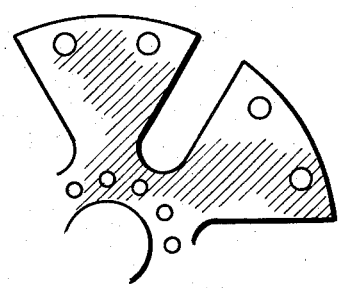

Figs. 4 to 7 inclusive show alternative positions of shaft members connected by a coupling according to the invention; and Fig. 8 shows another embodiment of the invention having relatively narrow slots in the coupling disc and being secured with two bolts at the end of each beam or arm.

Figure 1:
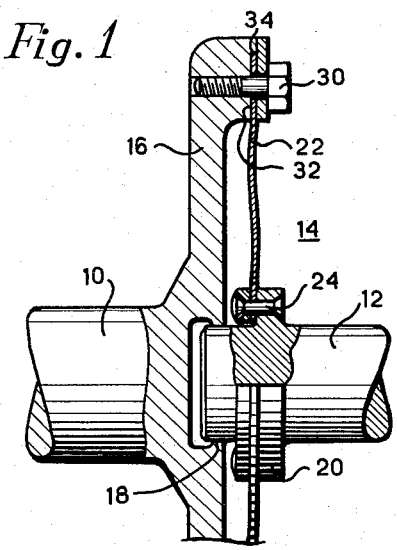
Fig. 1 is a longitudinal section of an elastic coupling according to the invention.
Figure 2:
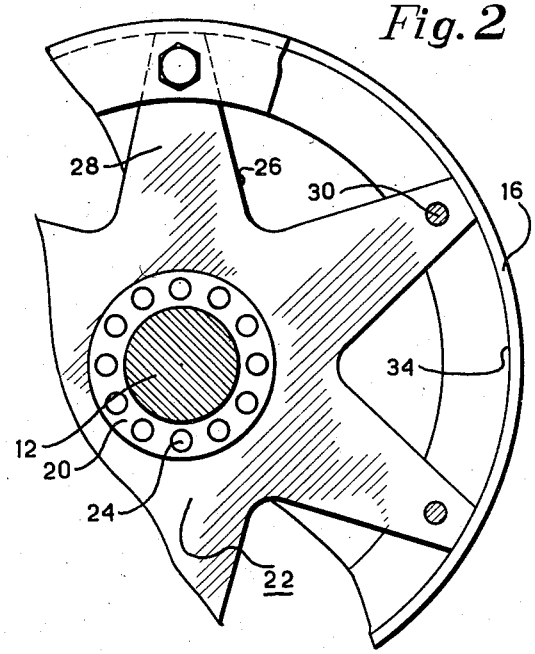
Fig. 2 shows an end view of the coupling, some parts being broken to show the construction more clearly.

Referring now more particularly to Figs. 1 and 2, numeral 10 designates the driving member or out-put shaft of an engine which is connected with a driven member or shaft 12 by a coupling member 14 providing, in accordance with the invention, a torsionally stiff but axially elastic coupling. The two shaft members are journalled in bearings and axially fixed by such bearings, not shown.

The end portion of shaft 10 is provided with a disc like member 16 which at its center receives the end portion of shaft 12 in a pilot bearing 18.

On shaft 12 there is provided an annular flange 20 supporting an elastic coupling disc member 22 secured to the flange by rivets 24. The coupling disc 22 is formed at its circumference with deep slots 26 separating radial beams or spokes 28 secured by fixed fastenings 30 to the rear side of the disc like member 16 in an annular groove 32. The outer peripheral edge of groove 32 forms an abutment for the spokes which are mounted with certain radially inwardly directed initial forces which gives a slender S-shape to the spoke shown in Fig. 1.

To obtain the advantages intended, the trailing edge of each spoke should in its inwardly extended direction pass closely to and outside the pitch circle of rivets 24 in order to give substantially pure tension forces in the spoke according to Fig. 2 upon torque transmission between the two rotating shafts.

The coupling disc 22 may also have the form as in Fig. 8 where the slots are of substantially even width and each spoke end is secured by two bolts to member 16, giving a torsionally stiffer disc but, on the other hand, not so axially elastic as the coupling disc of Fig. 2.

Figure 3:
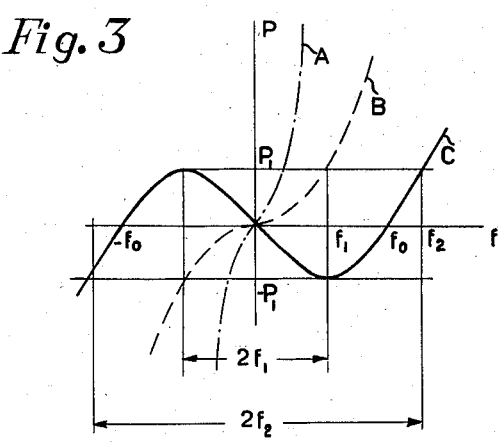
Fig. 3 illustrates diagrammatically the variation of the axial force P as a function of axial displacement of shaft ends connected by a coupling member comprising a disc like diaphragm with unbroken periphery, and according to the invention a disc like member provided with slots similar to Fig. 2, and a coupling member as shown in Fig. 2 mounted with radially inwardly directed initial forces.
Figure 4:
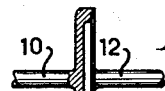
Figure 5:
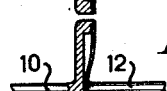
Figure 6:
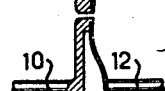
Figure 7:
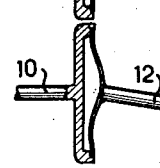

For disclosing the advantages derived from the invention, three curves are shown in Fig. 3, where the axial force P is shown as a function of the axial displacement $f$ for the three kinds of coupling discs. Curve A is for a diaphragm coupling disc according to prior art, B corresponds to a coupling disc according to the invention as shown in Fig. 2, without radially inwardly directed initial forces, and C illustrates the force variation in a coupling disc as shown in Fig. 2, mounted with radially inwardly directed initial forces.

In curve A the diaphragm coupling disc is actuated by fully developed bending and tensional forces, due to which the axial force P will increase rapidly for small increments in displacement $f$ of the shaft end.

By providing the coupling disc with slots according to the invention the bending forces will be partly reduced resulting in a less steep curve B. However, the total range of displacement permitted for a certain value of axial force P may be extended considerably if the diaphragm is mounted with greater radially inwardly directed initial forces, whereby curve C will be obtained. The radial inwardly directed initial forces on the spokes 28 will, in the range $+f_0$ to $-f_0$ tend to neutralize the bending forces, except for $f$ equal to nil, and outside $f_0$ the forces acting on the coupling disc will be the same as for curve B.

Accordingly, for a given value of allowable axial force $P_1$ the range of displacement is for curve B equal to $2f_1$, and for curve C equal to $2f_2$, the latter range being considerably wider.

Giving the radial initial force on the spoke suitable values, the range $2f_2$ may be regulated to suit the actual driving conditions, and this may be made for example by pressing the spoke ends into groove 34 which may have a smaller outer diameter than the diameter of that circle on which the spoke ends are located, or by having a suitable difference between the pitch circle diameters of the holes for the bolts in the disc 16 and in the coupling disc 22, respectively.

For the sake of clarity it may be further mentioned that curve C is composed of axial forces $P_2$ associated with the radial initial force applied to the disc and axial forces $P_3$ due to bending conditions, and that in a certain range of displacement $f$, $P_2$ and $P_3$ have opposed signs, the magnitude of $P_2$ being greater than that of $P_3$ in a certain range so that curve C representing $P_2+P_3$ will have a maximum and a minimum point, respectively, according to Fig. 3. The values of $P_2$ and $P_3$ may be approximately calculated from the following formulas:

$$P_2 = \frac{3EIf}{l^3}$$

and $$P_3 = \frac{EAf(f^2 - f_0^2)}{2l^3}$$

where

E is Youngs modulus
I is moment of inertia of the section
$f$ is axial displacement
$l$ is length of the spoke
A is average value of the section area of the spoke

I claim:

1. Apparatus of the character described, comprising a first rotary element, a second rotary element coaxial therewith and means providing an axially flexible and torsionally stiff torque transmitting connection between said elements comprising an integral disc-like flexible spoked coupling member having a hub portion rigidly secured to one of said elements, the outer end portions of the spokes being rigidly secured to the other of said elements, the peripheral width of the spokes being sufficient to provide at least one direct path of linear force transmission between the places at which the coupling member is rigidly fixed to the respective elements for transmitting torque from one to the other of said elements and the portions of said coupling member between said places being prestressed in radial compression.

2. Apparatus as defined in claim 1 in which the spokes of said coupling member taper outwardly from the hub portion of the member and the width of the spokes is such that the lines of the side edges of the spokes, projected inwardly across the hub portion of the member, lie radially outside the hub portion of the member rigidly secured to said one of said elements.

3. Apparatus as defined in claim 1 in which said spokes are of increasing peripheral width as the radius thereof increases.

4. Apparatus as defined in claim 3 in which each of said spokes is secured at its outer end to said other of said elements at a plurality of peripherally spaced places and the peripheral width of each spoke is such that a path for linear force transmission is provided through the spoke between each place of attachment thereof to said other element and the radially outermost hub portion of the member secured to said one of said elements.

5. Apparatus of the character described, comprising a first rotary element, a second rotary element coaxial therewith and means providing a flexible coupling between said elements comprising a flexible disc-like spoked coupling member having a hub portion rigidly secured to one of said elements and having the end portions of the spokes of the member rigidly secured to the other of said elements, said coupling member being secured to the respective elements with the portions of the member between the places of attachment thereof with the respective elements prestressed in radial compression with respect to the axis of rotation of said elements.

6. Apparatus of the character described comprising a first rotary element, a second rotary element coaxial therewith, and a flexible coupling for transmitting torque between said members comprising a flat plate-like spoked coupling member having a hub portion rigidly fixed to one of said elements, the end portions of the spokes of said member being rigidly secured to the other of said elements and said other of said elements having abutments against which the ends of the spokes of said member bear, the radial distance of said abutments from the axis of rotation being slightly less than the radial distance of the ends of said spokes, whereby when the parts are assembled in abutting relation said spokes are prestressed in radial compression.

References Cited in the file of this patent

UNITED STATES PATENTS

| | | |
|---|---|---|
| 1,562,437 | Clapham | Nov. 24, 1925 |
| 2,386,017 | Venditty | Oct. 2, 1945 |